United States Patent
Kalweit et al.

(10) Patent No.: US 6,397,152 B1
(45) Date of Patent: May 28, 2002

(54) METHOD AND MOTOR CONTROL APPARATUS FOR THE CORRECTION OF A COMPUTER-ESTABLISHED TORQUE IN THE DRIVE TRAIN OF A MOTOR VEHICLE

(75) Inventors: Dieter Kalweit, Schorndorf; Sven Merkle, Stuttgart; Ralf Woerner, Kernen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/258,881

(22) Filed: Mar. 1, 1999

(30) Foreign Application Priority Data

Feb. 27, 1998 (DE) .......................................... 198 08 167

(51) Int. Cl.⁷ .............................. G01L 1/00; G01L 3/00; G01L 5/00; G01L 25/00
(52) U.S. Cl. ............................ 702/41; 702/85; 702/105
(58) Field of Search ........................ 702/41, 33, 42–43, 702/85, 104–105, 113–114, 182–184, FOR 123, 124, 126, 130, 134–136, 156–163, 170–171; 701/51, 84, 87, 90; 73/1.11, 116, 862.339, 118.1

(56) References Cited

U.S. PATENT DOCUMENTS

| | | | | | |
|---|---|---|---|---|---|
| 3,877,300 A | * | 4/1975 | Ginns | ......................... | 73/1.11 |
| 4,625,697 A | * | 12/1986 | Hosaka | ........................ | 123/478 |
| 5,072,711 A | | 12/1991 | Katayama et al. | ........... | 123/486 |
| 5,184,527 A | * | 2/1993 | Nakamura | ................... | 477/110 |
| 5,454,001 A | * | 9/1995 | Nagatani et al. | ............ | 714/821 |
| 5,847,272 A | * | 12/1998 | Schneider et al. | ......... | 73/118.1 |
| 5,871,419 A | * | 2/1999 | Amendt | ....................... | 477/180 |
| 6,006,149 A | * | 12/1999 | Salecker et al. | ............... | 701/51 |
| 6,105,743 A | * | 8/2000 | Salecker et al. | ........... | 192/84.6 |
| 6,144,911 A | * | 11/2000 | Binz et al. | ..................... | 701/51 |

FOREIGN PATENT DOCUMENTS

| | | | |
|---|---|---|---|
| DE | 39 14 167 | 11/1989 | ........... F02D/41/22 |
| DE | 39 14 167 A1 | 11/1989 | ........... F02D/41/22 |
| DE | 43 04 779 | 12/1993 | ........... B60K/26/00 |
| DE | 43 04 779 A1 | 12/1993 | ........... B60K/26/00 |
| DE | 195 27 130 | 2/1996 | ........... B60K/41/04 |
| DE | 195 27 130 A1 | 2/1996 | ........... B60K/41/04 |
| EP | 0 787 619 | 8/1997 | ........... B60K/41/06 |

* cited by examiner

Primary Examiner—Marc S. Hoff
Assistant Examiner—Manuel L. Barbee
(74) Attorney, Agent, or Firm—Crowell & Moring LLP

(57) ABSTRACT

A method and control apparatus for the correction of a mathematically determined torque in the drive train of a motor vehicle, in which a recognition signal for distinguishing between automatic and manual transmissions is produced and motor and transmission operating states (selected in accord with the recognition signal) in which the actual torque applied to the crankshaft is equal to zero are established. When the motor and transmission operating states are reached, the mathematically determined torque associated with the operating states is compared to the actual (zero) torque, and the difference between the mathematically determined torque and the actual torque is used as a control factor for the correction of additional computed torques.

25 Claims, 3 Drawing Sheets

METHOD AND MOTOR CONTROL APPARATUS FOR THE CORRECTION OF A COMPUTER-ESTABLISHED TORQUE IN THE DRIVE TRAIN OF A MOTOR VEHICLE

BACKGROUND AND SUMMARY OF THE INVENTION

This application claims the priority of German application No. 198 08 167.7, filed Feb. 27, 1998, the disclosure of which is expressly incorporated by reference herein.

The invention relates to a method and a motor control apparatus for correcting a computer-established torque in the drive train of a motor vehicle.

German patent document DE 39 14 167 A1 discloses a safety system in a motor vehicle for ensuring that the throttle valve of the internal combustion engine will return to the closed position when the accelerator pedal is not operated, even in the event of failure of the throttle valve control system. The gas pedal position and the torque at the output of the transmission are detected by sensors; the torque is compared with a predetermined minimum value and an error signal is produced if the actual torque exceeds the minimum value. The error signal acts upon a system for interrupting the operation of the internal combustion engine.

This system only takes into account the failure of the throttle valve control system, and thus no other additional facilities for control and steering are possible (especially facilities for affecting road stability). Another disadvantage is due to the use of the torque sensor, whose use in large series production has yet to be satisfactorily solved.

The invention provides an improved method and control apparatus which, on the basis of predetermined signals representing the state of the motor and transmission, determine the torque by computer and perform a computerized adjustment using known torque levels at certain known points of operation. In this method, the use of a torque sensor can be dispensed with; determination of the torque is performed exclusively by computer, on the basis of factors which are easy to detect via sensors (for example, by sensing engine speed). By adjusting the difference between computed and known torque levels, an attempt is made to reduce systematic errors which affect torque computations.

German patent document DE 43 04 779 A1 discloses an apparatus for controlling the output torque of a drive unit of a vehicle. For this purpose, power parameters of the drive unit (i.e., the motor torque losses and the torque required by auxiliary units) are computed and subjected to correction by comparing actual values obtained from measuring systems to the theoretical values determined in the control apparatus. The determination of the theoretical torque, however, again requires the use of a torque sensor.

German patent document DE 195 27 130 A1 discloses a power transmission control apparatus which has a microcomputer for computing and estimating the values of the torque at the input of a torque converter for an automatic transmission, and includes the values of the transmission ratio of the automatic transmission. For this purpose, certain characteristics of the motor and the torque converter are determined experimentally and stored in performance characteristics. Using equations stored in the microcomputer which represent these characteristics and the values sought for the torque and the transmission ratio, it is possible to obtain estimates of the desired values.

In this case, the strong influence of the power absorbed by auxiliary equipment of the vehicle (the air conditioner, for example) upon the reference value of the torque is problematic. As a result, an accurate separation of the signals of the known torque into a percentage for association with the motor and a percentage for association with the auxiliary equipment is not possible. Depending on the operating state which is used as the basis for determining the reference value of the torque, the torque will be composed of different percentages for the motor and the auxiliary equipment. The value for the correction of the computed torque thus fluctuates according to the operating state of the motor and the active auxiliary equipment.

In view of the foregoing, it is an object of the invention to provide a method and motor control apparatus for mathematically determining the torque in the drive train of a motor vehicle as accurately as possible.

This and other objects and advantages are achieved by the method and motor control apparatus according to the invention, in which a recognition signal for distinguishing between automatic and manual transmissions is produced, and motor and transmission operating states (selected in accord with the recognition signal), in which the actual torque applied to the crankshaft is equal to zero, are established. Furthermore, when these motor and transmission operating states are reached, the mathematically determined torque associated with the operating states is compared with the actual torque, and the difference between the mathematically determined torque and the actual torque is used as a control factor for the correction of additional computed torques.

The method and motor control apparatus according to the invention, permits a reduction of the systematic error in the computation of the torque. Moreover, the method and motor control apparatus can be used in both automatic transmissions and manual transmissions. Automatic transmissions and manual transmissions are distinguishable by a recognition signal. As a result, separate construction of the motor control apparatus for each type of transmission is unnecessary.

The recognition signal is used to select the parameters and levels for the description of the operating states of the motor and transmission. Different states are taken into account according to the type of transmission for which an adjustment between the calculated torque and the actual torque must be satisfied. The motor and transmission operating states are selected such that there is no load on the crankshaft; that is, so that the actual torque applied at the crankshaft is equal to zero. The torque which is computed for this state is then obtained and compared with the (actual) zero torque. Any departure of the computed torque from zero is used as the control factor for the correction of additional, mathematically determined torques. The correction of the torque is performed preferably with the accessories turned off, in order to avoid falsification of the actual zero torque obtained and to be able to determine the difference in the computed torque.

In an embodiment of the process, the computed torque is composed of two components, an effective torque and a residual torque to allow for torque losses. These are especially composed of the addition of torque losses inherent in the motor and a torque adaptation value for improving the accuracy of the computed torque. The control factor (multiplied by a weighting factor in some cases) can be added to the torque adaptation value, if the computed torque is not equal to zero (in the state in question). In this manner, a shift of the torque adaptation value is obtained, and consequently a correction for all computed torques for all motor and transmission states is achieved. As soon as the conditions are restored for an actual torque equal to zero, a new control factor can be formed and the torque adaptation value can again be modified accordingly.

The conditions for an actual torque equal to zero differ according to the type of transmission. In the case of a manual transmission, the transmission is advantageously idling, the vehicle speed is zero, and the motor must be at its working temperature. These conditions must be satisfied in order to exclude non-static and dynamic influences.

In the case of an automatic transmission, the operating state of the converter is preferably used in determining the conditions. The actual torque is zero, provided that the crankshaft speed corresponds approximately to the speed of the driven wheels, so that the two rotors of the converter have approximately the same speed. In addition, an allowance can be made for the vehicle's speed and the motor temperature.

The motor control apparatus according to the invention, comprises various intercommunicating modules. In a first module, a recognition signal is produced in order to distinguish between automatic and manual transmissions. In a second module, a status signal is produced which indicates whether the motor and transmission operating states at which the actual torque applied to the crankshaft is equal to zero have been reached. In a third module, a torque adaptation value is formed from the difference between the computed torque and the actual torque; the third module can be activated by the status signal from the second module.

This embodiment has the advantage that all conditions which must be satisfied in order for the actual torque to be equal to zero can be determined and checked in advance before the computation of the torque adaptation value is performed. Furthermore, both automatic and manual transmissions can be covered by only one motor control apparatus.

Other objects, advantages and novel features of the present invention will become apparent from the following detailed description of the invention when considered in conjunction with the accompanying drawings.

DETAILED DESCRIPTION OF THE DRAWINGS

Figure 1:
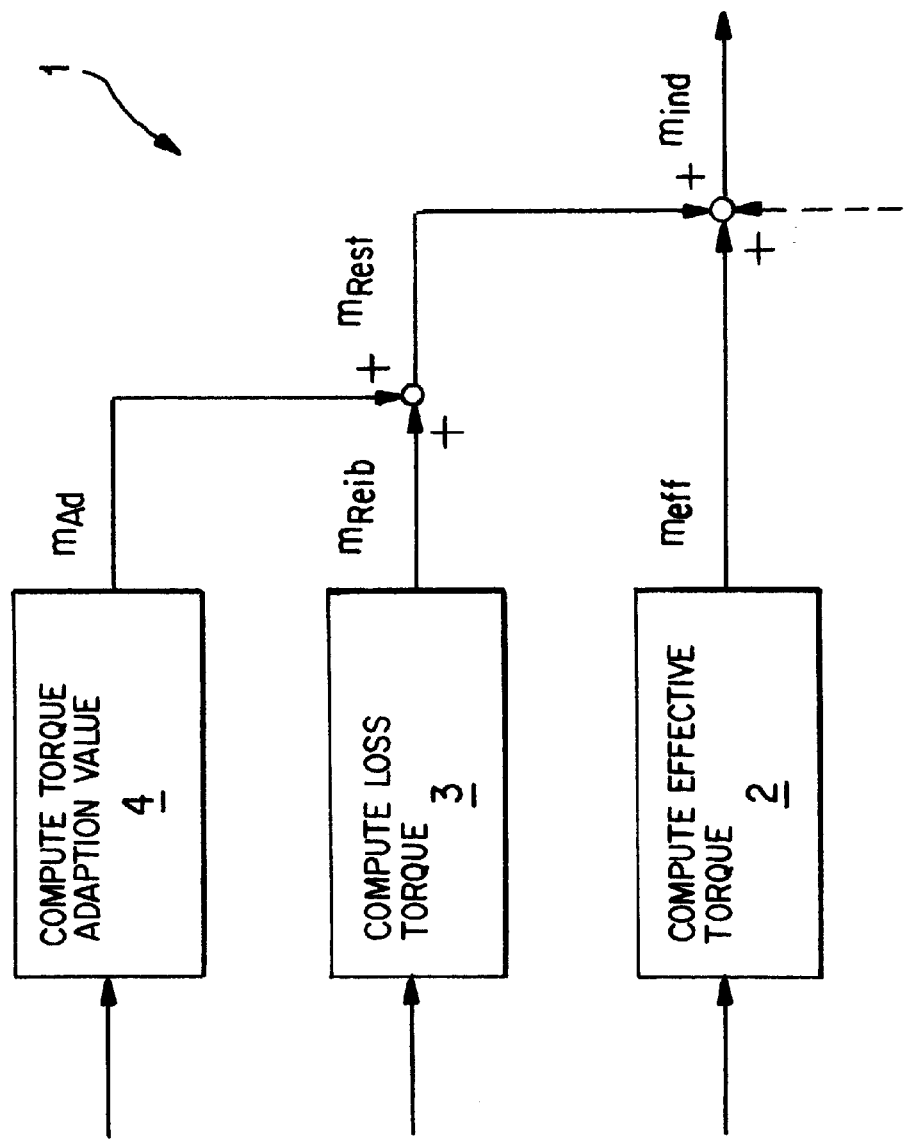
FIG. 1 is a block circuit diagram of a motor control apparatus.

The block circuit diagram represented in FIG. 1 shows a section of a motor control apparatus 1 with which the torque in the drive train of a motor vehicle can be mathematically determined. The motor control apparatus 1 has various computing blocks 2, 3 and 4, to which input signals representing physical status factors and parameters of the internal combustion engine and drive train can be fed. The detected torque components are available at the output of each computing block 2, 3 and 4 in the form of torque output signals.

In the computing block 2, the effective torque $m_{eff}$ (present at the crankshaft) is computed and the effective torque $m_{eff}$ of other electronic motor components (for example, components for electronic stability control) are fed to this computing block. At the output of the computing block 2, the effective torque $m_{eff}$ and a residual torque $m_{Rest1}$ (allowing for torque losses and a correction value) are summed to form an indexed total torque $m_{ind}$. The residual torque $m_{Rest}$ is additively composed of two components: the loss torque $m_{Reib}$, to allow for all losses within the motor (especially a mechanical friction factor, motor residual torques and an altitude-related portion of the charge changing work) as well as the torque adaptation value $m_{Ad}$ which is used to improve the accuracy of the computed torque $m_{eff}$, as noted previously. The loss torque $m_{Reib}$ is computed in the computing block 3, and the torque adaptation value mAd is computed in computing block 4.

Figure 2:
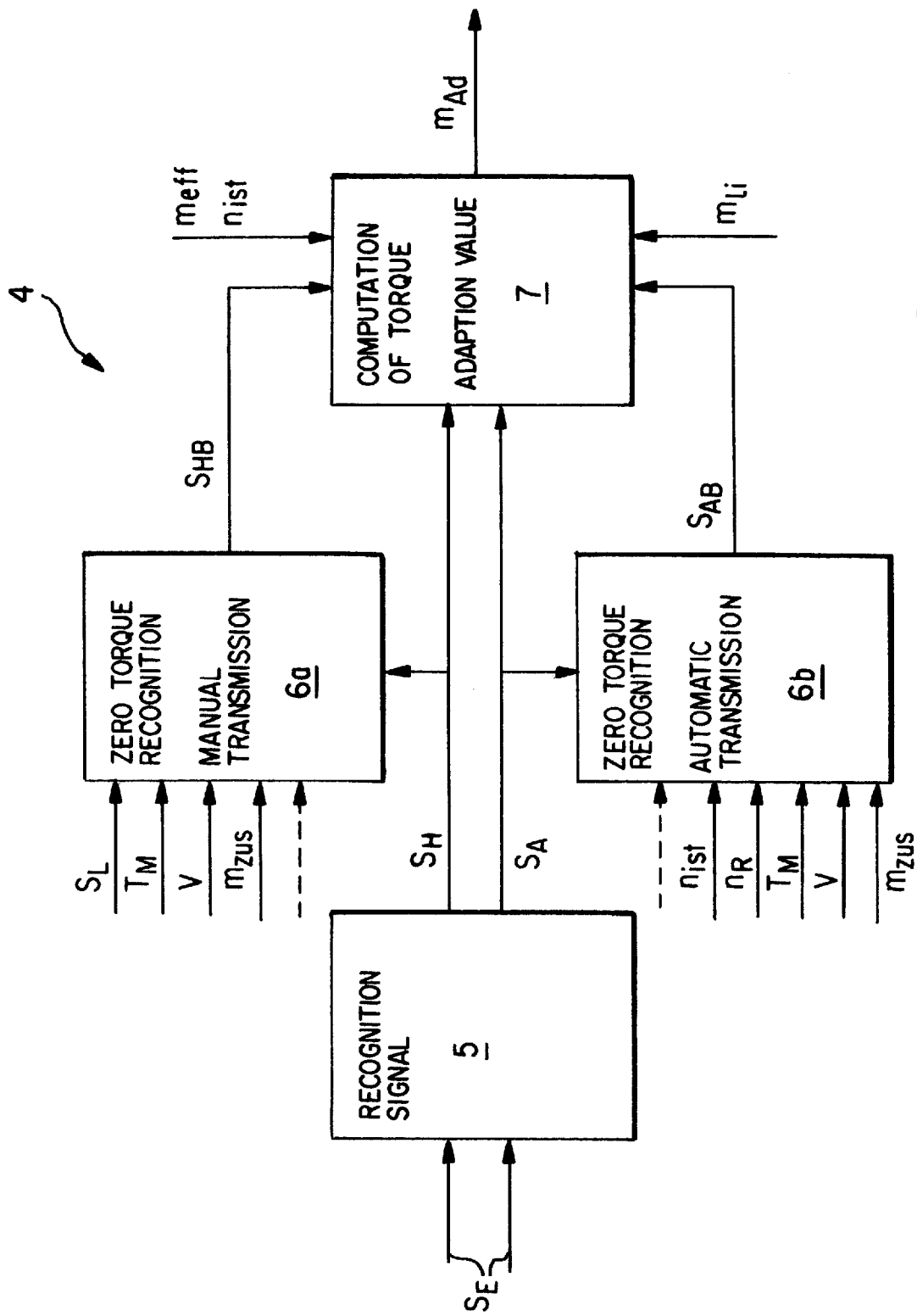
FIG. 2 is a block circuit diagram of a computer block of the motor control apparatus.

FIG. 2 shows (schematically) the operation of computing block 4 in producing the torque adaptation value $m_{Ad}$. Computing block 4 includes a number of modules 5, 6a, 6b and 7 (shown separately according to their function). The first module 5 serves to produce a logical recognition signal $S_H$ and $S_A$ for establishing the kind of transmission used (i.e., manual transmission or automatic transmission). For this purpose logical input signals $S_E$, which originate from an internally used data bus and are in the form of CAN codes, are fed to module 5.

In modules 6a and 6b, logical status signals $S_{HB}$ and $S_{AB}$, which indicate whether the conditions necessary for a correction of the torque are present, are produced. These conditions relate to motor and transmission operating states in which the actual torque present at the crankshaft is known. Provision is made for selecting a motor and transmission operating state in which the actual torque is equal to zero.

Module 6a serves to recognize the motor and transmission operating states when a manual transmission is used. Recognition signal $S_H$ is fed as an activating input signal to module 6a to indicate that a manual transmission is used. Additional parameters and status factors which are fed to module 6a, as additional input signals, are then determined. These additional input signals are a logical in-neutral signal $S_L$, the motor temperature $T_M$, the vehicle speed v, additional torques $m_{zus}$ which originate from the accessories, as well as additional input factors as needed, for example, heating of the catalyst, starter, throttle valve angle, rotatory speed, etc.

The transmission-in-neutral signal $S_L$ indicates whether the transmission is in neutral, which must be satisfied as a necessary condition for torque correction. Furthermore, the motor must be idling, and especially the motor temperature $T_M$ must be above a given minimum level. The vehicle speed must be zero, and no accessories must be engaged, so that no additional torque $m_{zus}$ is produced. If these conditions are fulfilled, the crankshaft has no load and the actual torque is zero. The logical status signal $S_{HB}$ (at the output of module 6a) is switched to "true", and fed as an activating input signal and switch signal to module 7 in which the computation of the torque adaptation value mAd is performed.

Module 6b serves for the recognition of the operating states of the motor and transmission when an automatic transmission is employed. The recognition signal $S_A$ is fed from the first module 5 as an activating input signal to the module 6b, indicating that an automatic transmission is in use. The conditions for a zero actual torque are present if the two rotors of the converter of the automatic transmission are rotating at about the same speed. To be able to determine this, the crankshaft speed $n_{ist}$ and the speed $n_R$ of the driven wheels is fed to module 6b. In some cases, the gradient of the speed curve is taken into consideration, in order to obtain a sufficiently large time interval for the comparison of the crankshaft speed nor and the speed $n_R$ of the driven wheels.

Other input factors are the motor temperature $T_M$, in order to judge whether the motor is idling, the vehicle speed v, as well as additional torques $m_{zus}$ of accessory equipment which must be zero. If all conditions are satisfied, the logical status signal $S_{AB}$ at the output of module $6_b$ is switched to "true" and fed to module 7.

The computed effective torque $m_{eff}$, the crankshaft speed nis and a top and bottom limit $m_{li}$ are fed as physical input signals to module 7. The status signals $S_{HB}$, $S_{AB}$ and the recognition signals $S_H$ and $S_A$ from the first module 5 are present as logical input signals; the logical input signals are used in order to allow for different computation rules or different multipliers for manual transmissions and automatic transmissions.

If the computed effective torque $m_{eff}$ differs from the actual torque which is equal to zero, the computed torque $m_{eff}$ is used for the formation of a new torque adaptation value $m_{Ad}$ by multiplying the torque $m_{eff}$ by a weighting factor and adding it to a raw adaptation value. The raw adaptation value is stored as an initial value for the first calculation and is the adaptation value from preceding computing cycles. The new, modified torque adaptation value is then limited by the torque limitation values $m_{li}$ and corrected by multiplying it by a speed-related evaluation factor. The final torque adaptation value $m_{Ad}$ is present in signal form at the output of module 7 and is added, according to FIG. 1, to the effective computed or given torque $m_{eff}$.

Figure 3:
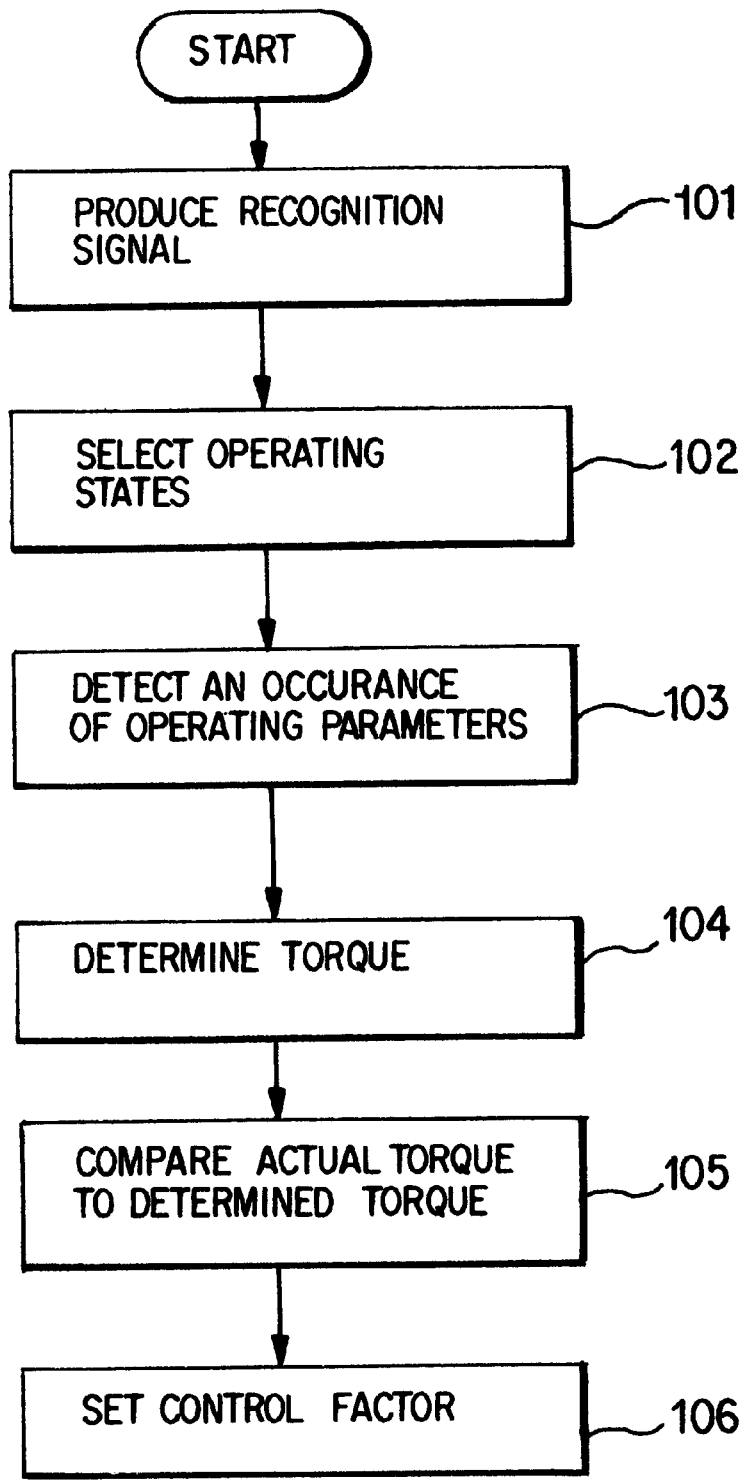
FIG. 3 is a flow chart of the method according to the invention.

FIG. 3 is a flow chart showing the fundamental steps of the method according to the invention. In a first step 101, a logical recognition signal $S_H$ and $S_A$ for establishing the type of transmission in use is produced. In a second step 102, the operating states, in which the actual torque present at the crankshaft is known, are selected. In step 103 an occurrence of the set of vehicle parameters is detected. The torque associated with the detected vehicle parameters is determined in a subsequent step 104. The actual torque is compared to the determined torque in step 105. In step 106, based on this comparison, a control factor is then established.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for correction of a mathematically determined torque in a drive train of a motor vehicle, comprising the steps of:
   producing a recognition signal for recognition of one of an automatic transmission and a manual transmission;
   establishing, based on the recognition signal, a set of vehicle operating parameters at which an actual torque applied to a motor vehicle crankshaft is equal to zero;
   detecting an occurrence of said set of vehicle operating parameters;
   mathematically determining torque associated with a detected occurrence of said vehicle operating parameters;
   determining a difference between the mathematically determined torque and actual zero torque associated with said vehicle operating parameters; and
   using said difference as a control factor to correct additional mathematically calculated torques.

2. The method according to claim 1, wherein said vehicle operating parameters include at least one of a motor operating state and a transmission operating state.

3. The method according to claim 2, wherein a total computed torque comprises an effective torque and a residual torque to compensate for torque losses.

4. The method according to claim 1, wherein said correcting of the mathematically determined torque is performed while auxiliary units are deactivated.

5. The method according to claim 4, further comprising the step of:
   summing a torque loss and a torque adaptation value to generate a computed residual torque.

6. The method according to claim 5, further comprising the steps of:
   multiplying the control factor by a weighting factor; and
   adding the control factor to a torque adaptation value.

7. The method according to claim 6, further comprising the step of:
   limiting the torque adaptation value to predeterminable limit values.

8. The method according to claim 7, further comprising the step of:
   multiplying the torque adaptation value by a rotatory-speed-dependent evaluation factor.

9. The method according to claim 6, further comprising the step of:
   multiplying the torque adaptation value by a rotatory-speed-dependent evaluation factor.

10. The method according to claim 5, wherein when a manual transmission is recognized, said vehicle operating parameters include: gear box in neutral, vehicle velocity zero, and a vehicle engine at full operating temperature.

11. The method according to claim 5, wherein when an automatic transmission is recognized, said vehicle operating parameters include: motor operating state and transmission operating state.

12. The method according to claim 1, wherein a total computed torque comprises an effective torque and a computed residual torque to allow for torque losses.

13. The method according to claim 1, wherein when a manual transmission is recognized, said vehicle operating parameters include: gear box in neutral, vehicle velocity zero, and a vehicle engine at full operating temperature.

14. The method according to claim 1, wherein when an automatic transmission is recognized, said vehicle operating parameters include: motor operating state and transmission operating state.

15. The method according to claim 14, further comprising the step of:
   establishing a torque converter operating state via crankshaft speed and speed of driven wheels of the vehicle.

16. Method according to claim 15, further comprising the step of:
   establishing a vehicle velocity and stationary vehicle velocity at full operating temperature.

17. Method according to claim 14, further comprising the step of:
   establishing a vehicle velocity and stationary vehicle velocity at full operating temperature.

18. A motor control apparatus for correction of a mathematically determined torque in a drive train of a motor vehicle, comprising:
   a first module for producing a recognition signal for recognizing one of an automatic transmissions and manual transmission;
   a second module for producing a status signal for recognizing occurrence of a set of vehicle operating parameters in which an actual torque applied to a crankshaft of the motor vehicle is equal to zero; and a third module for forming a torque adaptation value based on a difference between a mathematically determined torque and actual torque;

wherein the third module is activatable by the status signal produced by the second module.

19. The method according to claim 18, wherein said vehicle operating parameters include at least one of a motor operating state and a transmission operating state.

20. The motor control apparatus according to claim 19, wherein the second module recognizes motor and transmission state of an automatic transmission, the crankshaft speed and the speed of driven wheels of the vehicle.

21. The motor control apparatus according to claim 18, wherein the second module recognizes motor and transmission operating state of a manual transmission, a transmission-in-neutral signal and a signal comprising a vehicle velocity.

22. The motor control apparatus according to claim 18, wherein the second module recognizes motor and transmission state of an automatic transmission, the crankshaft speed and the speed of driven wheels of the vehicle.

23. The motor control apparatus according to claim 18, wherein additional torques from auxiliary equipment are feedable as input signals to the second module.

24. The motor control apparatus according to claim 18, wherein a motor temperature comprising an input signal is feedable to the second module.

25. The motor control apparatus according to claim 18, wherein torque limitation values, weighting and evaluation factors are feedable to the third module.

* * * * *